United States Patent [19]
Kriek

[11] Patent Number: 4,762,871
[45] Date of Patent: Aug. 9, 1988

[54] THERMOPLASTIC POLYESTER COMPOSITIONS HAVING IMPROVED RELEASE PROPERTIES

[75] Inventor: George R. Kriek, Bethel Park, Pa.

[73] Assignee: Mobay Corporation, Pittsburgh, Pa.

[21] Appl. No.: 5,728

[22] Filed: Jan. 21, 1987

[51] Int. Cl.$^4$ .............................................. C08L 67/02
[52] U.S. Cl. ..................................... 524/94; 524/377; 525/437
[58] Field of Search .................... 524/94, 377; 525/437

[56] References Cited

U.S. PATENT DOCUMENTS

| | | | |
|---|---|---|---|
| 2,588,660 | 3/1952 | Roche | 524/377 |
| 3,052,646 | 9/1962 | Doggett | 524/377 |
| 3,368,995 | 2/1968 | Furukawa et al. | 260/40 |
| 3,435,093 | 3/1969 | Cope | 260/857 |
| 3,516,957 | 6/1970 | Gray et al. | 260/22 |
| 3,639,527 | 2/1972 | Brinkmann et al. | 260/873 |
| 3,725,348 | 4/1973 | Harrison et al. | 260/75 |
| 3,725,351 | 4/1973 | Harrison et al. | 260/75 |
| 4,223,113 | 9/1980 | Bier et al. | 525/439 |
| 4,254,011 | 3/1981 | Bier | 260/40 |
| 4,290,937 | 9/1981 | Cohen | 260/40 |
| 4,317,764 | 3/1982 | Sheer | 524/449 |
| 4,352,904 | 10/1982 | Deyrup | 524/292 |
| 4,366,276 | 12/1982 | Freitag et al. | 524/94 |
| 4,371,476 | 2/1983 | Newkirk | 524/567 |
| 4,425,457 | 1/1984 | Christiansen | 524/293 |
| 4,548,978 | 10/1985 | Garrison | 524/314 |

FOREIGN PATENT DOCUMENTS

| | | | |
|---|---|---|---|
| 0025573 | 3/1981 | European Pat. Off. | |
| 2083495 | 3/1974 | France | |
| 56-127655 | 10/1981 | Japan | 524/377 |
| 57-145145 | 9/1982 | Japan | 524/377 |

Primary Examiner—Patricia Short
Attorney, Agent, or Firm—Gene Harsh; Joseph C. Gil; Aron Preis

[57] ABSTRACT

A reinforced, flame retardant molding composition based on polyalkylene terephthalate were found to be imparted an improved level of mold release properties upon the incorporation therein of a sufficient amount of a compound conforming to the structure of

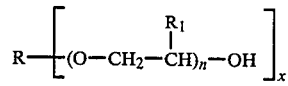

wherein R is a hydrocarbon derivative of a polyhydric alcohol preferably ethylene glycol, glycerol or pentaerythritol, $R_1$ is hydrogen or a lower alkyl, n is about 10 to 30 and x is 2, 3 or 4.

1 Claim, No Drawings

THERMOPLASTIC POLYESTER COMPOSITIONS HAVING IMPROVED RELEASE PROPERTIES

FIELD OF THE INVENTION

The invention is concerned with a thermoplastic polyester composition and more particularly a flame retardant, reinforced thermoplastic composition having improved mold release properties.

BACKGROUND OF THE INVENTION

Thermoplastic polyester molding compositions have been reported in the patent literature and are well known in the market place. Mostly these compositions are based on polyalkylene terephthalates with polyethylene terephthalate (PET) and polybutylene terephthalate (PBT) being the most popular resins. The art is noted to include U.S. Pat. No. 3,368,995 which discloses long glass fibers used to improve the crystallization performance of the resin. U.S. Pat. No. 3,435,093 discloses improving the properties of the resin by the addition thereto of metal carboxylate bearing polyolefins. U.S. Pat. No. 3,639,527 discloses the addition of polyolefins to improve the impact strength of the resin. Improving the mold release characteristics of glass filled polyalkylene terephthalate compositions has been disclosed in U.S. Pat. No. 3,516,957. The technology entails combining the monomeric nucleating agent and the monomeric aliphatic carboxylic acid ester. Oligomeric polyesters useful in enhancing the crystallization behavior of PET based compositions have been disclosed in U.S. Pat. No. 4,223,113. The flame retardance, in particular the dripping behavior of glass reinforced polyethylene terephthalate molding compositions, was disclosed to be improved by the addition of polyolefins bearing carboxylic acid ester groups, such as methylacrylate groups, in U.S. Pat. No. 4,254,011. U.S. Pat. No. 4,352,904 describes a polyethylene wax as a mold release agent in the context of flame retardant polyalkylene terephthalate based composition. U.S. Pat. No. 4,290,937 discloses compositions containing polybutylene terephthalate and an ethylene alkylate acid copolymer having improved release properties. U.S. Pat. No. 3,725,348 and U.S. Pat. No. 3,725,351 both list polyalkylene oxides as co-monomers in PET.

SUMMARY OF THE INVENTION

In accordance with the present invention there is provided a reinforced, flame retardant polyester composition incorporating a particular polymeric reaction product of a polyhydric alcohol and a suitable oxide. The composition is characterized by its improved mold release properties.

The release agent of the present invention conforms to

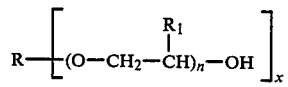

where R is the hydrocarbon portion of a polyhydric alcohol.

$R_1$ is a hydrogen or a lower alkyl,
n is about 10 to 30 and
x is 2, 3, or 4.

DETAILED DESCRIPTION OF THE INVENTION

The resinous base of the molding composition of the present invention is a polyalkylene terephthalate. These linear saturated polyesters of terephthalic acid and a suitable situated diol are well known. The resins have an inherent viscosity in excess of about 0.4 dl/gm measured as a 0.5 weight percent solution in a 60:40 mixture of phenol and tetrachloroethane at 25° C. Up to about 10 mol percent of the acid component may comprise either aromatic dicarboxylic acids having from 8 to 14 carbon atoms, aliphatic dicarboxylic acids having from 4 to 8 carbon atoms or cycloaliphatic dicarboxylic acids having from 8 to 12 carbon atoms. Examples of such dicarboxylic acids which may be included with the terephthalic acid include phthalic acid, isophthalic acid, naphthalene-2, 6-dicarboxylic acid, diphenyl 4,4'-dicarboxylic acid, adipic acid, sebacic acid and cyclohexane diacetic acid. The diol component is preferably ethylene glycol or butylene glycol and in either case may contain up to 10 mol percent of either aliphatic diols having from 4 to 8 carbon atoms, cycloaliphatic diols having from 6 to 15 carbon atoms or aromatic diols having from 6 to 21 carbon atoms. Examples of such additional additional codiols include 3-methylpentane diol-(2,4), 2-methylpentane diol-(1,4), hexane diol-(1,3), and 2,2-bis-(4-hydroxypropoxyphenyl)-propane.

The polyalkylene terephthalate utilized in the present invention can be branched by incorporating trihydric or tetrahydric alcohol or tribasic or tetrabasic acids as described in German Offenlegungsschrift No. 1,900,270 and in U.S. Pat. No. 3,692,744. Examples of suitable branching agents include trimesic acid, pyromellitic acid, trimethanol propane and ethane and pentaerythritol. It is advisable not to use more than about 1 mol percent of branching agent based on the quantity of the acid component.

The preferred polyalkylene terephthalate is polyethylene terephthalate. The resin is derived substantially only from ethylene glycol and terephthalic acid or its esters or its anhydrides. Also particularly preferred are polyethylene terephthalates having inherent viscosities in excess of about 0.5 dl/gm and less than about 0.8 dl/gm.

The reinforcing agent entailed in the present invention is an agent recognized as having reinforcing effect on the base resin. It is present in an effective amount to reinforce the base resin which amount is generally between 5 and 60 weight percent based on the weight of the composition. It is preferred to use between 15 and 50 weight percent and most preferably to use between 20 and 45 weight percent of the composition.

Any of the conventional, art recognized reinforcing agents, including fibers and platelets of metals or non-metals are suitable. The preferred reinforcing agent is in the form of glass fibers. Any of the types of glass fibers generally known to be useful in the art of thermoplastic resins may be utilized in the composition of the present invention. Suitable glass fibers are described in British Pat. No. 1,111,012, U.S. Pat. No. 3,368,995 and German Offenlegungsschrift No. 2,042,447.

Glass filaments made of calcium-aluminium-borosilicate-glass which is relatively free from sodium are preferably used. Glass of this type is known as "E" glass. Other glasses however, having low sodium carbonate content, "C" glass are also suitable.

The usefulness of any particular type of glass fiber does not depend on its average length or its diameter. It is only necessary that the glass fibers be sufficiently long to impart a reinforcing effect to the composition. It is convenient to use the reinforcement in the form of glass fiber staple having a length of between 3 and 25 millimeters preferably having a length of less than about 6 millimeters. The glass fiber length in an extrusion blended composition is likely to be considerably shorter than the glass fiber length in the starting material because of the communition that takes place during the extrusion process. Subsequent injection molding of this composition will reduce the glass fiber length even further.

Other reinforcing agents may be used instead of, or in combination with, the glass fibers. It is only necessary that they impart a reinforcing effect to the polyalkylene terephthalate resin. Such materials must obviously be able to withstand the temperature and the shear conditions encountered in the normal thermoplastic processing of the injection molded composition. Suitable fibers include those of graphite and polyamide. Other suitable reinforcing agents include fibers, whiskers, platelets of metal or non-metals of materials such as iron, nickel, ceramics, carbon (filaments), silicates, asbestos, silica, mica and glass. Although mica and talc have been primarily recognized in the art as mineral fillers it has been observed that they can also enhance some of the physical properties of PET and are therefore included among the suitable reinforcing materials.

The flame retarding agent useful in the present context comprises a family of compounds well known in the art. It is used in at least sufficient amount that if it were alone incorporated in the polyalkylene terephthalate it would impart to the resin a flame retardance of at least V-0 at ⅛" as measured in the UL-94 test. It is preferred to use between about 3 and 20 weight percent of the flame retarding agent with between 5 and 15 weight percent being particularly preferred, said percentages being in relation to the weight of the composition. The flame retarding additives contain chemical elements which are used because of their flame retarding capacity, for example bromine, chlorine, antimony, phosphorus and nitrogen. Suitable flame retarding agents are described in U.S. Pat. No. 4,136,089 which is incorporated herein by reference. Preferably the flame retarding additives consist of halogenated organic compounds (brominated or chlorinated) optionally in a mixture with organic or inorganic antimony compounds, for example antimony trioxide; of elemental phosphorus or phosphorus compounds or of halogen containing compounds in a mixture with phosphorus compounds or compounds which contain phosphorus nitrogen bonds. The preferred halogenated compounds are aromatic compounds. Examples are 2,2-bis-(3,5-dichlorphenyl)-propane, 1,1-bis-(2,5-dichlorophenyl)-ethane and 2,2-bis-(3-bromo-4-hydroxyphenyl)-propane. Halogen substituted benzenes, such as tetrabromobenzene, hexachlorobenzene and hexabromobenzene and biphenyls such as 2,2'-dichlorobiphenyl, 2,4'-dibromobiphenyl, 2,4'-dichlorobiphenyl, hexabromobiphenyl, octobromobiphenyl and decabromobiphenyl and halogenated biphenyl ethers which contain 2 to 10 halogen atoms also fall within the scope of the suitable flame retarding agents.

In general the preferred phosphorus compounds are selected from elementary phosphorus of organic phosphonic acids, phosphonates, phosphinates, phosphonites, phosphinites, phosphene oxides, phosphites or phosphates.

Triphenylphosphine oxide is an example of this category of compounds. It can be used either alone or as a mixture with hexabromobenzene or a chlorinated biphenyl and optionally antimony trioxide. The most preferred phosphorus compound is triphenyl phosphate in combination with hexabromobenzene and optionally with antimony trioxide.

The compounds which contain phosphorus-nitrogen bonds such as phosphonitrile chloride, phosphorus ester amides, phosphoric acid amides, phosphonic acid amides and phosphinic acid amides can also be used as flame retarding additives.

Particularly preferred flame retarding additives are oligomers of a carbonate of a halogenated dihydric phenol. These oligomeric additives have a low volatility when they are heated to temperatures of about 200° C. and a softening point of less than about 300° C. They are employed alone or combination with substances having a synergistic action such as inorganic or organic antimony compounds.

Polytetrafluoroethylene may be used in the composition of the invention in order to reduce the dripping of the flaming composition. These are known in the art and are available commercially. The preferred polytetrafluoroethylene resins are designated by ASTM as type 3 and are available commercially from the duPont Company as Teflon resin type 3.

Among the preferred polytetrafluoroethylene are those having average particle sizes between 0.3 to 0.7 millimeters and those which form a fibrous network in the polyester matrix.

The amount of drip suppressant may conveniently be about 0.5 and 2.5 per a hundred parts of the base composition.

The release agent in the context of the present invention conforms structurally to

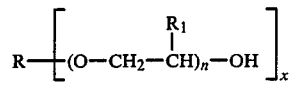

where R is the hydrocarbon portion of a diol, triol or tetraol alcohol, preferably ethylene glycol, glycerol or pentaerythritol, $R_1$ is hydrogen or a $C_1$-$C_6$ alkyl radical, n is about 10 to 30 and x is 2, 3, or 4.

Suitable agents may be prepared by reacting a suitable polyhydric alcohol with an excess of an oxide, preferably ethylene oxide or propylene oxide or mixtures thereof. A particularly suitable agent is the reaction product of glycerine and excess propylene oxide. A commercial product suitable as a mold release agent in the present context is available from Union Carbide Corporation under the trade designation LG-56.

In preparing the compositions within the scope of the present invention there is incorporated an amount of the release agent sufficient to improve the mold release properties of the composition. Preferably the added amount is about 0.1 to about 5%, more preferably about 0.3 to about 3% of mold release agent relative to the weight of the composition.

The compositions of the present invention may also contain antioxidants and agents to enhance the composition resistance to hydrolysis. A particularly useful class of thermal stabilizers are the oxetane phosphite compounds described in U.S. Pat. No. 4,066,617 incorporated herein by reference. Nucleating agents and crystallization rate promoters as well as pigments and fillers may also be included in the composition of the invention.

The compositions of the present invention may be prepared by any of the techniques known in the art for the preparation of thermoplastic molding compositions. A particularly preferred technique of preparation is extrusion blending. In a preferred technique polyalkylene terephthalate resin is blended first with any liquid additives and then with any powdered additive and finally with the reinforcing agent. The mixture may then be fed through an extruder and the extruder strands chopped to produce platelets of the composition. The compositions of the present invention are suitable for the manufacture of a variety of molded articles by injection molding.

The invention is further illustrated but is not intended to be limited by the following examples in which all parts and percentages are by weight unless otherwise specified.

EXAMPLES

The compositions used in demonstrating the invention were prepared by extrusion blending on a 2" vented extruder having a 30:1 L/D barrel fitted with a 2.75:1 screw. PET pellets were tumble blended with the other additives in powder form for two minutes and the mixture was then tumble blended with the glass fibers for an additional 30 seconds. Because the extruder is vented, the materials were fed directly to it without pre-drying. The extruder barrel zones were all set at 260° and both the gate and die were set at 245° C. The screw was run at an approximate speed of 90 rpm. The stands were fed to a belt which carried them to a water bath, through an air knife into a cutter.

The moldability was evaluated in accordance with an especially developed mold release test which evaluated the force necessary to release a molded part from a specially designed mold. In particular, a 3½" diameter disc with 4 intersecting ribs was molded on a 15 oz. Stokes injection molding machine using a 510° F. melt temperature, an injection pressure of 20,000 psi, a back pressure of 100 psi; a screw speed of 75 rpm; a cycle time of 30 seconds and a 120° C. mold temperature. The ribs were designed with no drafts, i.e. their sides were perpendicular to the plane of the disc so that the width of the rib was the same as its base and at its top. The ribbed disc was released from the mold by 8 knockout pins which were attached to a common steel plate which in turn was driven by a hydraulic piston. A transducer attached to the piston recorded the force necessary to release the molded ribbed disc from the mold. The piston pressure required to achieve release with any given composition is a relative amount of the mold release of that composition. In each case at least ten measurements (moldings) were made after it was determined that a reproducible molding cycle had been established and the average value and the standard deviation were reported.

The following materials were utilized in the examples:

PET was a polyethylene terephthalate (Eastman Kodak, Tenite 7741) having an inherent viscosity of 0.6 dl/g measured as a 0.5 weight % solution in a 60:40 mixture of phenol and tetrachloroethane at 25° C.

Glass was chopped strand glass fiber having an approximate diameter of 10 microns and a reportedly epoxy functional sizing. It was obtained from PPG Industries as 3540 Glass.

A composition in accordance with the invention consisting of 45.9% PET, 30.3% of glass fibers, 3.5% antimony oxide, 10.6% of 1,2-bis-(tetrabromophthalimide)-ethane, 0.5% of LG-56, 8.5% of an acrylate based impact modifier (Acryloid KM 330, Rohm & Haas), 0.5% of Epon 1031, an epoxy compound and 0.1% of each of a thermal stabilizer conforming to

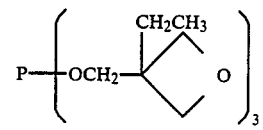

and an hydrolytic stabilizer conforming to

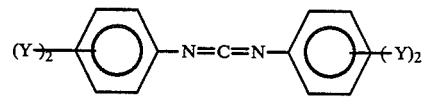

where Y is

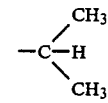

A corresponding (control) composition from which LG-56 has been omitted was also prepared. The impact modifier, the epoxy and stabilizers are believed to be of no critical significance to the compositions of the invention. The postion pressure in psi was measured in both compositions. The control composition measure 79.3 psi whereas the composition in accordance with the invention required only 43.0 psi. Clearly the mold release of the composition in accordance with the invention is much superior to the prior art composition.

Naturally modifications and variations of the present invention are possible in view of the above teachings. It is however to be understood that the changes may be made in the particular embodiments described above which are within the intended scope of the invention as defined in the claims.

What is claimed is:

1. A thermoplastic molding composition having good mold release comprising
   (a) polyethylene terephthalate;
   (b) 15 to 50% by weight of glass fibers;
   (c) a sufficient amount of 1,2-bis-(tetrabromophthalimide)-ethane to render the composition a rating of V-0 for ⅛" specimen in accordance with UL-94; and
   (d) an amount of a compound conforming to

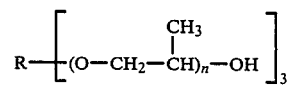

wherein R is derived from glycerine and n is from 10 to 30, sufficient to impart to the composition improved mold release properties.

* * * * *